US007633450B2

(12) United States Patent
Brittingham et al.

(10) Patent No.: US 7,633,450 B2
(45) Date of Patent: Dec. 15, 2009

(54) RADAR ALTERING STRUCTURE USING SPECULAR PATTERNS OF CONDUCTIVE MATERIAL

(75) Inventors: David L. Brittingham, Canton, OH (US); James T. Hindel, Tallmadge, OH (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 11/586,892

(22) Filed: Oct. 26, 2006

(65) Prior Publication Data

US 2007/0115163 A1 May 24, 2007

Related U.S. Application Data

(60) Provisional application No. 60/737,959, filed on Nov. 18, 2005.

(51) Int. Cl.
*H01Q 1/02* (2006.01)
*B64D 15/12* (2006.01)
*H01Q 15/00* (2006.01)

(52) U.S. Cl. ........................ 343/704; 244/134 D; 342/5

(58) Field of Classification Search ................ 343/704, 343/705, 706, 707, 708; 244/134 D, 134 R; 342/1, 2, 4, 5, 7, 13
See application file for complete search history.

(56) References Cited

U.S. PATENT DOCUMENTS 2,976,184 A 3/1961 Blatz
3,733,606 A 5/1973 Johansson
3,763,349 A 10/1973 Desloge
3,887,920 A 6/1975 Wright et al.
4,019,699 A 4/1977 Wintersdorff et al.
5,103,371 A 4/1992 Ogawa et al.
5,223,849 A 6/1993 Kasevich et al.
5,346,160 A * 9/1994 Pisarski ................. 244/134 R
5,398,890 A 3/1995 Weisend, Jr. et al.
5,657,951 A 8/1997 Giamati
5,717,397 A 2/1998 Ruszkowski, Jr.
5,837,739 A 11/1998 Nowak et al.
5,866,273 A 2/1999 Wiggins et al.
6,318,667 B1 11/2001 Morton
6,402,093 B1 6/2002 Wang
6,624,359 B2 9/2003 Bahlmann et al.

(Continued)

FOREIGN PATENT DOCUMENTS

DE 2759657 A1 11/1977

(Continued)

OTHER PUBLICATIONS

International Search Report and Written Opinion dated Oct. 11, 2006 from PCT/US2006/12973.

(Continued)

*Primary Examiner*—Hoang V Nguyen
*Assistant Examiner*—Robert Karacsony
(74) *Attorney, Agent, or Firm*—Calfee, Halter & Griswold LLP

(57) ABSTRACT

A radar altering structure comprises: a structure; and at least one layer of conductive material disposed at at least one surface of the structure, the layer comprising a plurality of conductive paths arranged in a specular pattern to reduce the radar cross section of the structure.

21 Claims, 8 Drawing Sheets

U.S. PATENT DOCUMENTS

| | | | | |
|---|---|---|---|---|
| 6,951,985 | B1 | 10/2005 | Lemelson | |
| 2005/0067532 | A1 * | 3/2005 | Hindel et al. ........... | 244/134 D |
| 2006/0227056 | A1 | 10/2006 | Brittingham et al. | |

FOREIGN PATENT DOCUMENTS

| | | | |
|---|---|---|---|
| DE | 3507889 | | 9/1986 |
| DE | 3830335 | A1 | 9/1987 |
| DE | 3730435 | | 2/1991 |
| DE | 3730435 | C1 | 2/1991 |
| EP | 362 662 | | 4/1990 |
| EP | 0737148 | A1 | 7/1995 |
| EP | 1 604 908 | A3 | 1/2006 |
| EP | 1 703 247 | A1 | 9/2006 |
| GB | 838624 | | 6/1960 |
| GB | 1047220 | | 11/1966 |
| GB | 1314624 | A | 4/1973 |
| GB | 2038712 | | 7/1980 |
| GB | 2243412 | A | 10/1991 |
| GB | 2428275 | A | 1/2007 |
| WO | 0108973 | A1 | 2/2001 |
| WO | 01/43507 | | 6/2001 |
| WO | 0232189 | A1 | 4/2002 |
| WO | 03 095729 | A1 | 11/2003 |
| WO | 03 100364 | A3 | 12/2003 |

OTHER PUBLICATIONS

Search Report for GB0622087.5, dated Feb. 8, 2007, mailed Feb. 9, 2007.

Search Report for GB 0622087.5 dated May 23, 2007, mailed May 24, 2007.

* cited by examiner

RADAR ALTERING STRUCTURE USING SPECULAR PATTERNS OF CONDUCTIVE MATERIAL

This application claims the benefit of the U.S. Provisional Application No. 60/737,959, filed Nov. 18, 2005.

BACKGROUND OF THE INVENTION

Electro-thermal heating has become an effective choice for airfoil and structure deicer heaters, especially when composite materials are used for the airfoils and/or structures being deiced. An electro-thermal heater may be used wherever icing conditions exist, including applications such as: airfoil leading edges of wings, tails, propellers, and helicopter rotor blades; engine inlets; struts; guide vanes; fairings; elevators; ships; towers; wind turbine blades; and the like, for example. In electro-thermal deicing systems, heat energy is typically applied to the surface of the airfoil or structure through a metallic heating element via electrical power supplied by the aircraft or appropriate application generators.

An exemplary electro-thermal deicing apparatus is shown in the cross-sectional illustration of FIG. 1. The apparatus comprises a heater element layer of electrically conductive circuits 10 which may be configured as metal foils, wires, conductive fabrics and the like, for example, disposed in a pattern over a surface 12 of an airfoil or other structure 14. A deicing system 20 controls the voltage and current to the electrical circuits of layer 10 via a plurality of leads 16 to protect the surface 12 from accumulating ice. Generally, the heater element conductive pattern is implemented over or under the skin of the airfoil or structure, or embedded in the composite material itself.

An exemplary heater element pattern 10 is shown in the illustration of FIG. 2. Electro-thermal deicer patterns of this type have a tendency to give off a larger than desired cross-sectional radar image in response to radar illumination. This has become a particular problem when such deicer heater patterns are applied to military aircraft or other structures that may be illuminated by enemy radar systems. To protect an aircraft or structure from becoming a target, it is desired to keep the radar cross-section of the structure as small as possible. Accordingly, the metallic/conductive patterns of the circuits of heater element layer 10 render present electrothermal deicing apparatus impractical for use on structures where radar attenuation is of concern.

SUMMARY OF THE INVENTION

In accordance with one aspect of the present invention, a radar altering structure comprises: a structure; and at least one layer of conductive material disposed at at least one surface of the structure, the layer comprising a plurality of conductive paths arranged in a specular pattern to reduce the radar cross section of the structure.

In accordance with another aspect of the present invention, electrothermal deicing apparatus with radar altering properties comprises: a heating element comprising at least one layer of conductive material disposable at at least one surface of a structure for deicing the surface, the layer comprising a plurality of conductive paths arranged in a specular pattern to reduce the radar cross section of the structure; and a control unit coupled to the heating element for controlling the heating energy thereto to deice the surface.

In accordance with yet another aspect of the present invention, apparatus for creating different radar signatures of a structure to an illuminating electromagnetic radiation source comprises: at least one layer of conductive material disposable at at least one surface of a structure, the layer comprising a plurality of conductive paths arranged in a specular pattern to reduce the radar cross section of the structure; and a switching unit coupled to the layer of conductive material to selectively apply electrical energy thereto for creating different radar signatures of the structure to the illuminating electromagnetic radiation source.

DETAILED DESCRIPTION OF THE INVENTION

Figure 2:
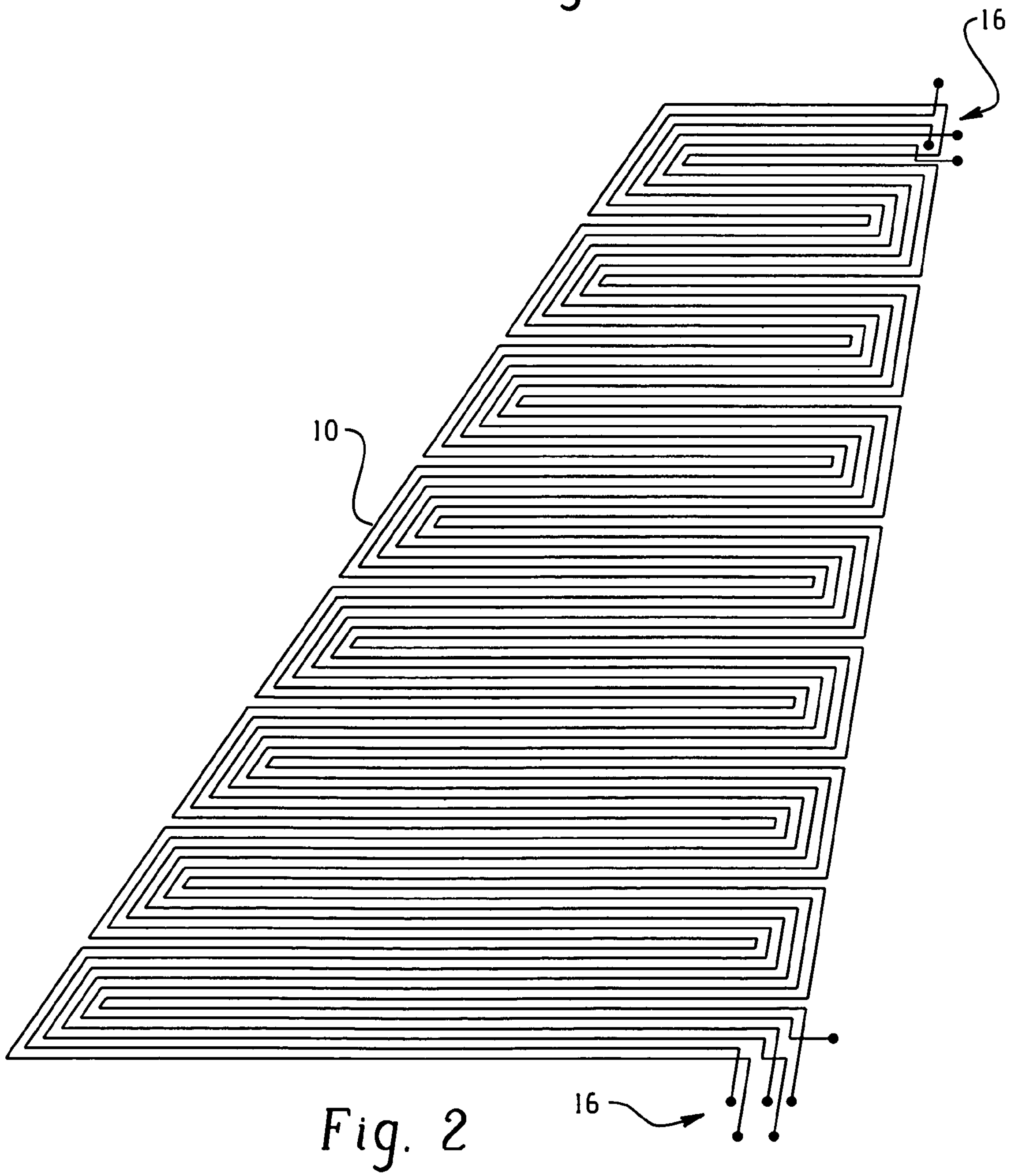
FIG. 2 is an illustration of an exemplary heater element pattern currently comtemplated for use in electro-thermal deicing apparatus.

For military applications, it is well known that structures, such as aircraft surfaces, for example, are designed to operate stealthily against radar illumination. However, when an electro-thermal heater element with circuit patterns such as those exemplified in FIG. 2 are applied to the surface of such structures, the heater element circuit patterns alter the radar cross-section of the structure rendering the structure more vulnerable to radar illumination. Note that the circuit pattern design of FIG. 2 comprises conductive circuit paths that are substantially transverse to electromagnetic illumination by a point source monostatic radar from the front, the rear or either side. Accordingly, the circuit paths of such patterns create intense reflected electromagnetic waves directly back to the point source radar to magnify the radar cross-section of the structure.

Figure 1:
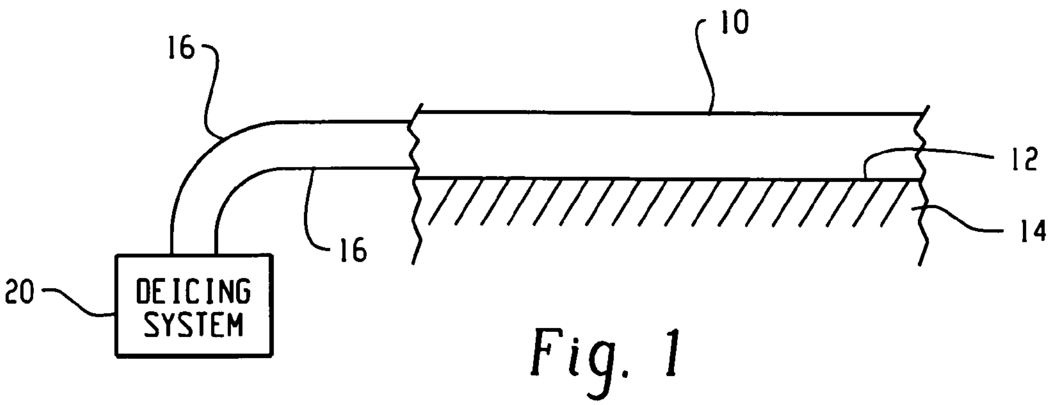
FIG. 1 is a cross-sectional schematic illustration of exemplary electro-thermal deicing apparatus.

The radar cross-section altering embodiments of the present invention which will be described in greater detail herein below involve the modification and enhancement of the specular characteristics for the electromagnetic properties of the electro-thermal heater elements to provide additional magnetic and electrical energy loss due to reflective and interference mechanisms. In the present embodiments, this energy loss is designed to occur when an electromagnetic wave of energy is applied by a radar source at a desired frequency of utilization (MHz or GHz) and over a broadband range to maximize absorption of electromagnetic energy by normal or modified conductors of the heater element and dampen the radar signals returned thereby to the radar source. Note that the heater elements via conductive paths 16 are electrified by the deicing system 20 as illustrated in FIG. 1.

Specular pattern designs 1-6 of the various embodiments of the conductive paths of the heater element 10 are shown by way of example in FIGS. 3-8, respectively. Preferably, round wire may be used for the conductive paths because of its inherent reflective properties to reduce returns from illumination by a point source monostatic radar. However, it is understood that the conductive paths of the various heater element patterns may be etched foil, metallic coated fabric or the like without deviating from the broad principles of the present invention. Likewise, the preferred application of the heater element patterns is integration into composite non-metallic structures. However, applying the heater element patterns over or under metallic or non-metallic surfaces of a structure will work as a radar altering structure just as well.

Figure 3:
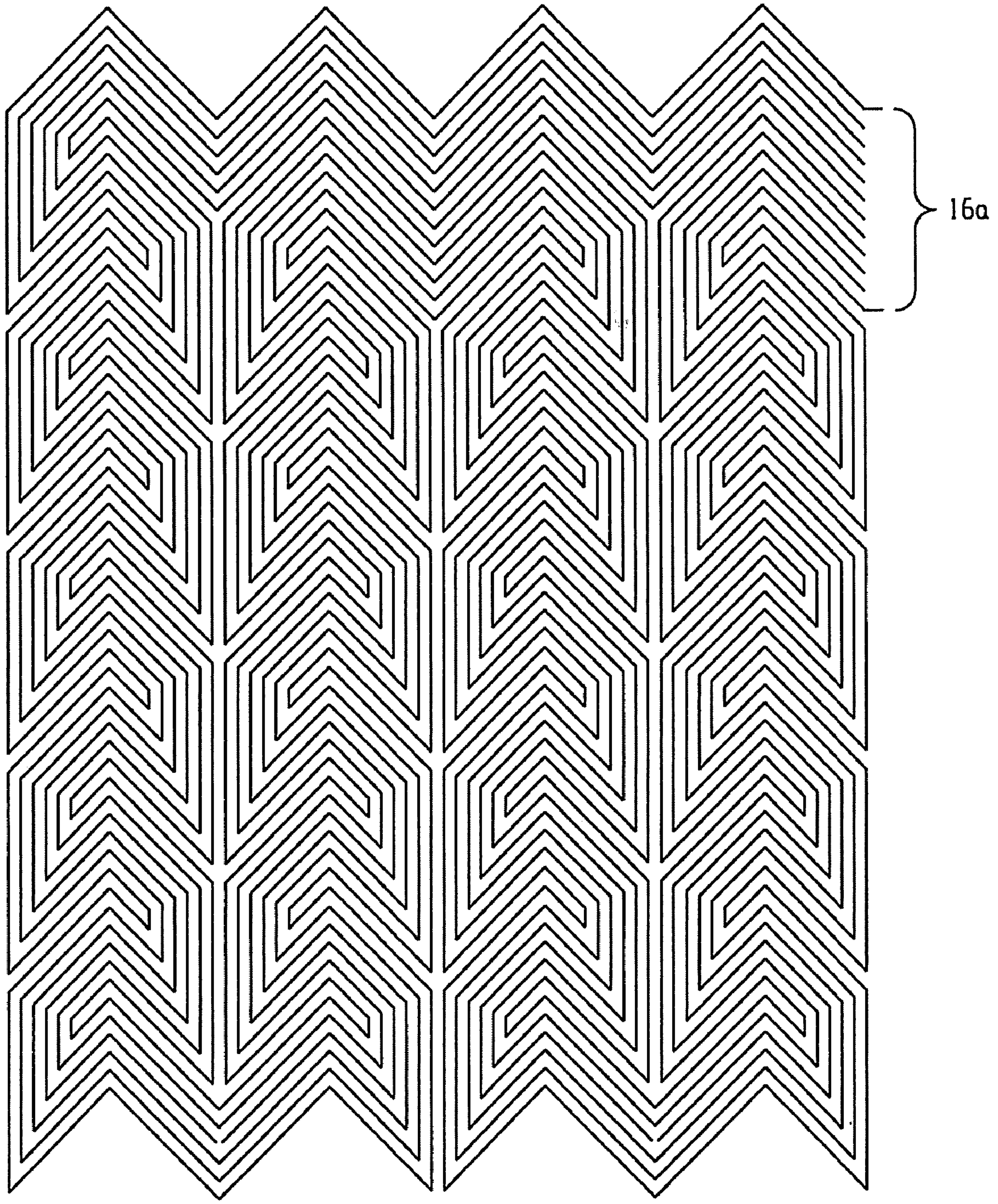
FIGS. 3-8 are examples of specular conductive patterns 1-6, respectively, suitable for embodying the broad principles of the present invention.
Figure 4:
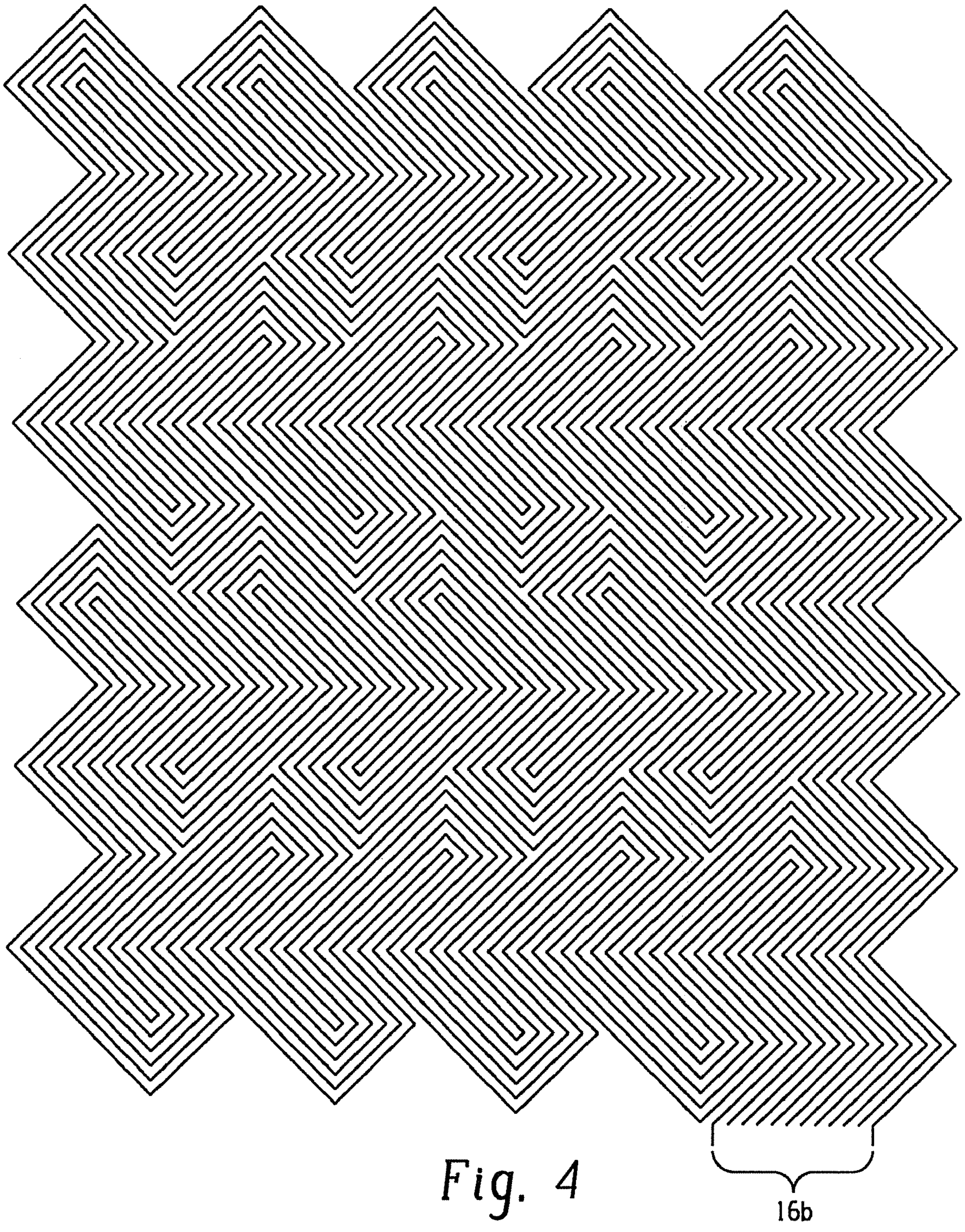
Figure 5:
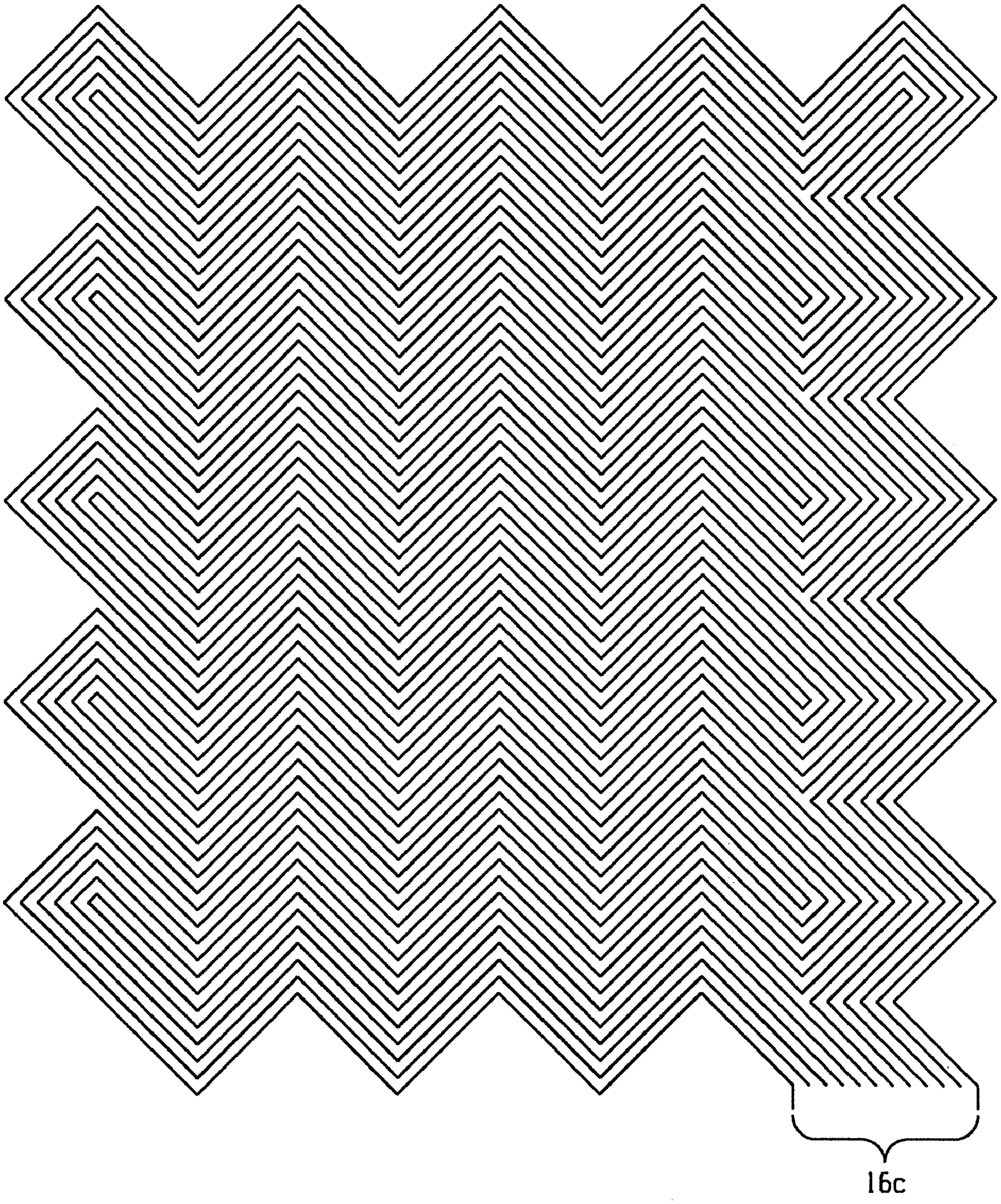
Figure 6:
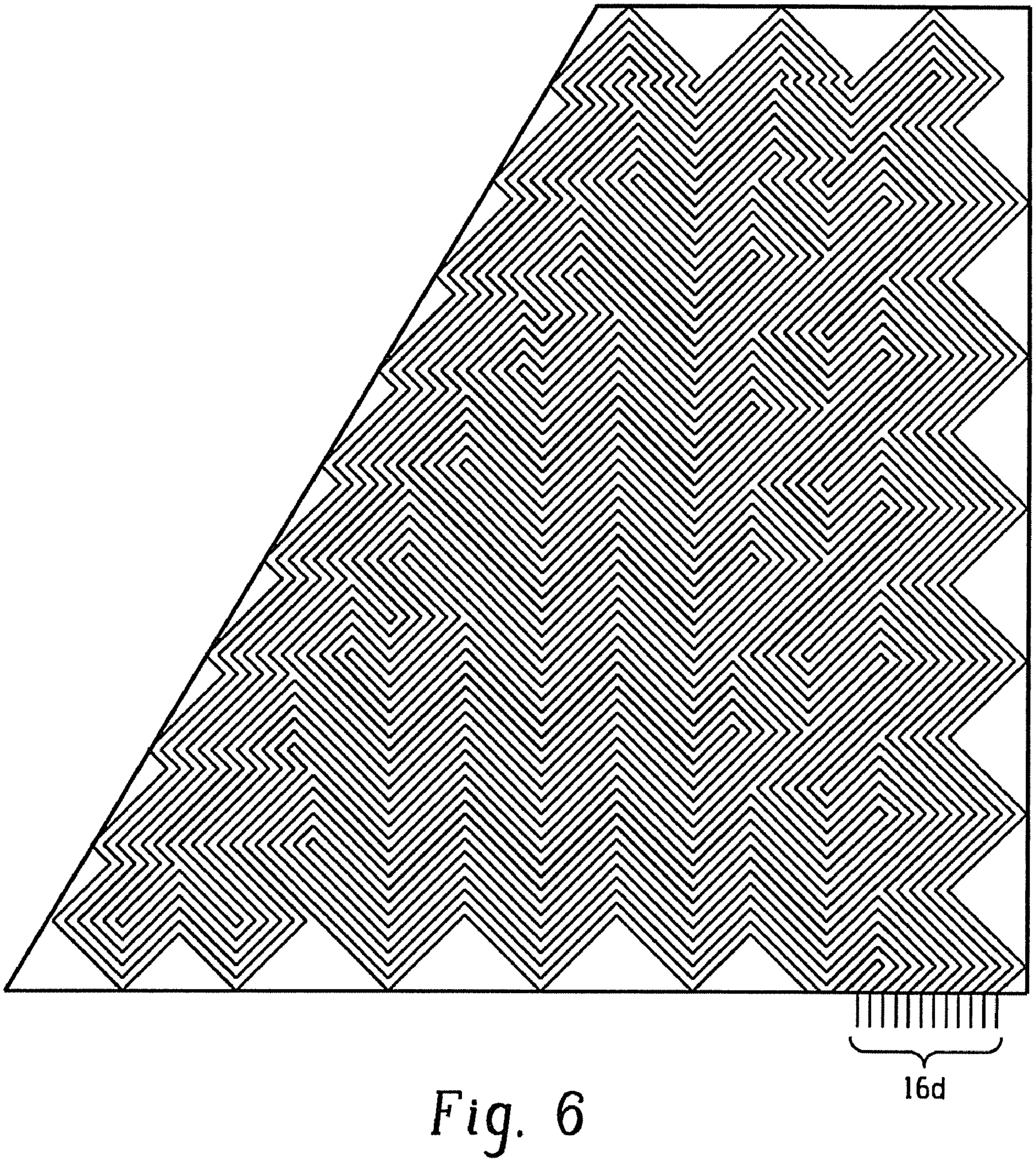

Each of the specular patterns 1-6 comprises six (6) conductive paths with a supply lead and return lead for each path, rendering twelve (12) connecting leads for each pattern. The connecting leads for each specular pattern 1-6 are found in FIGS. 3-8 at 16*a*-16*f*, respectively. The conductive paths of each of the specular patterns 1-4 and 6 start and end in the same vicinity. For example, the two outer leads of 16*a* in FIG. 3 are the supply and return connector leads of one conductive path, and the next two outer leads going inward are the supply and return connecting leads of another conductive path, and so on. In each specular pattern 1-4 and 6, the conductive paths are juxtaposed and electrically isolated from one another with one conductive path being circumscribed by another extending outwardly until a final outer conductive path completes the overall pattern.

Figure 7:
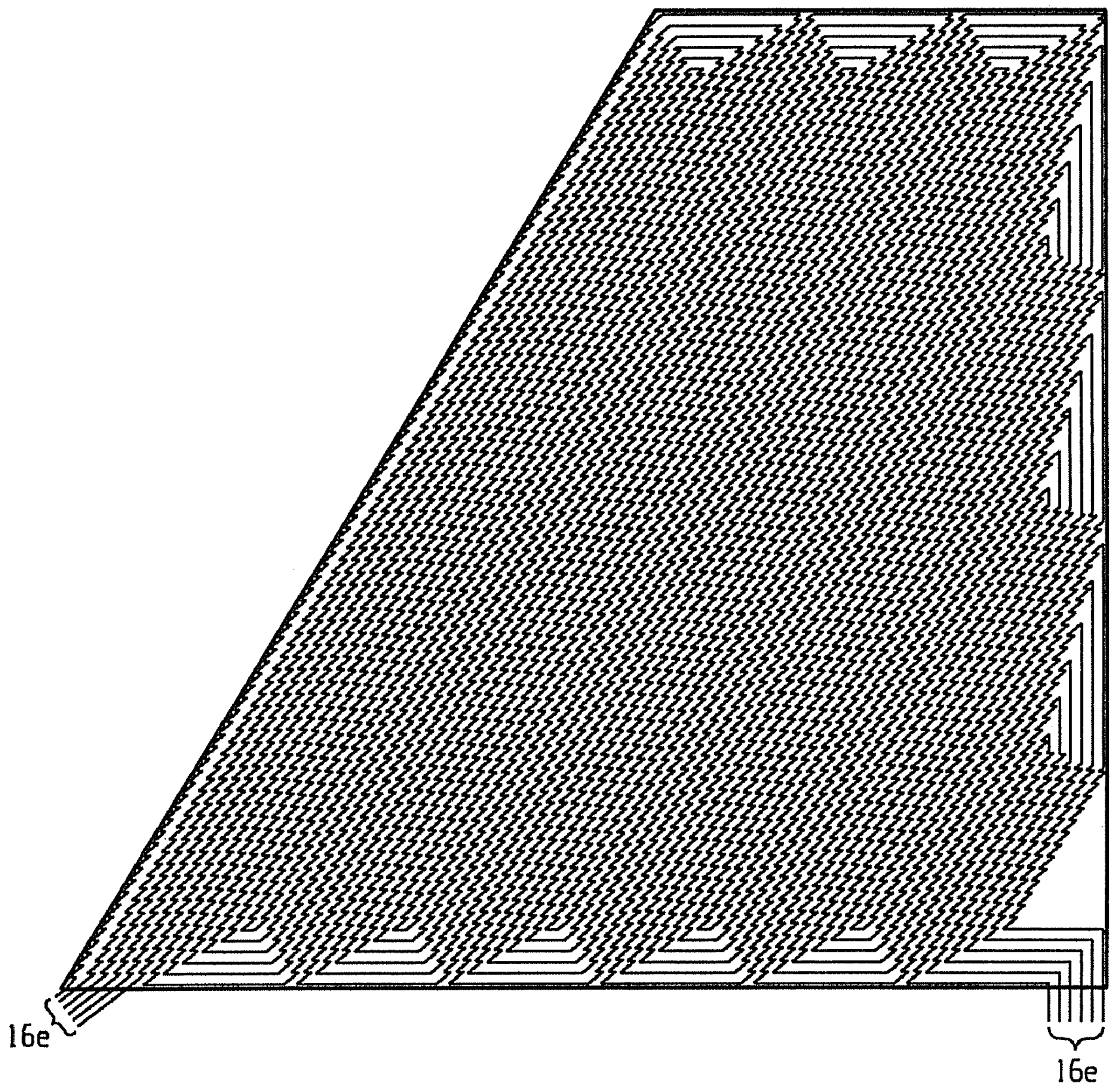
Figure 8:
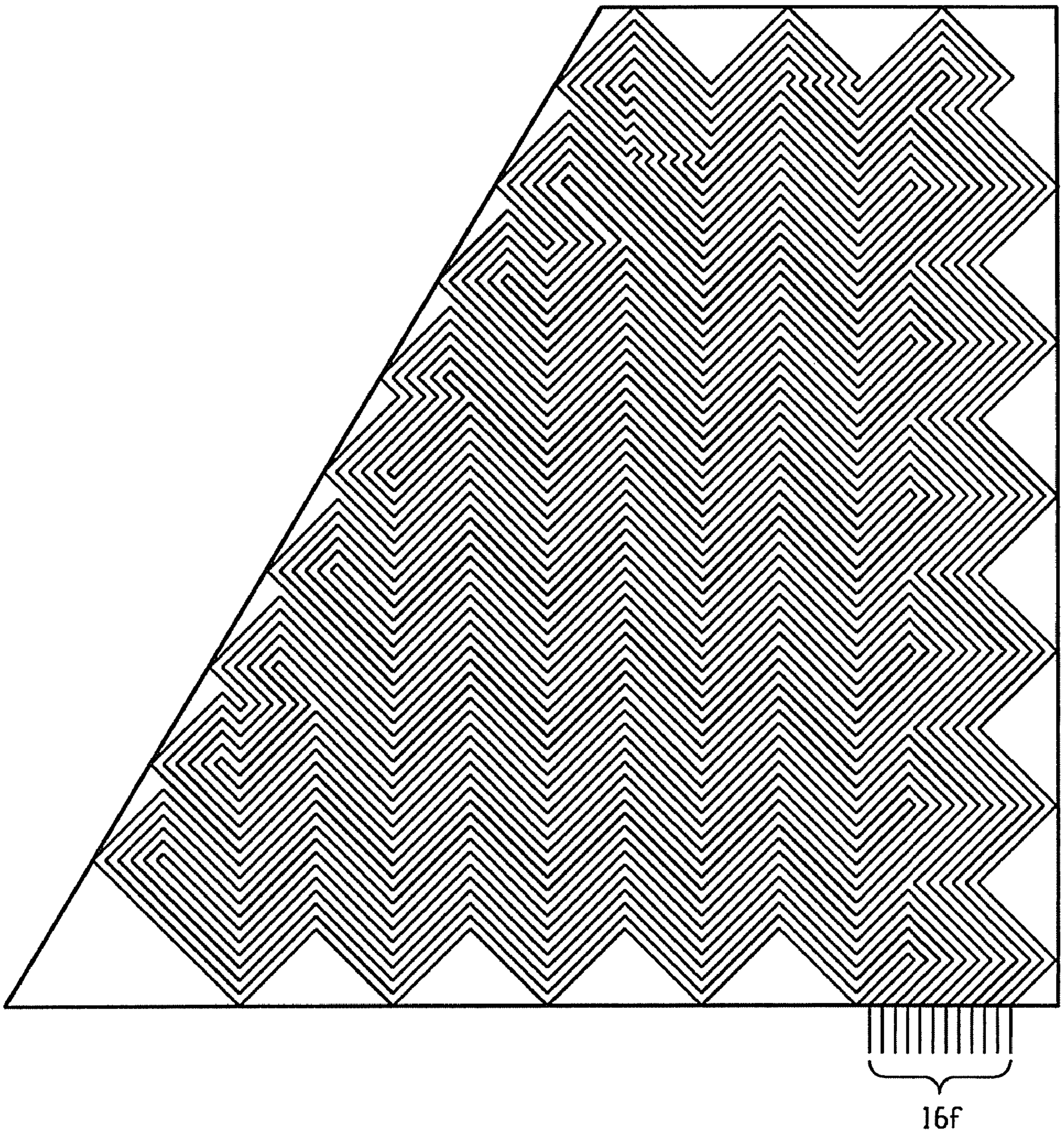

The specular pattern 5 of FIG. 7 is slightly different from the others having conductive paths that are juxtaposed and electrically isolated from one another, except that the conductive paths are not circumscribed by each other. Rather, each conductive path starts at one end of the specular pattern and runs back and forth forming a plurality of three sided subpatterns one within the other extending across the overall pattern. Thus, the conductive paths end at the other end of the specular pattern 5.

The conductive paths of the specular patterns 1-4 and 6 comprise short zig-zag and angular straight line runs of repeating subpatterns which are designed to provide opposing perpendicular lines of electromagnetic reflectance at a forty-five degree (45°) angle with respect to the line of sight a point source monostatic radar creating destructive zones of interference from any unabsorbed electromagnetic waves. The specular pattern 5 is different from the others as noted above and comprises larger subpatterns made from conductive paths of longer runs which are wavy line paths and not straight line paths as in specular patterns 1-4 and 6. Notwithstanding the difference of specular pattern 5, each of the specular patterns 1-6 function to reflect the electromagnetic waves away from returning to their source or to create a destructive interference between the electromagnetic waves. In either case, the electromagnetic waves returned to the radar source from the structure are altered in such a way that reduces the radar cross-section of the structure.

While the specular patterns of conductive paths have been described herein above as an electro-thermal heater element as illustrated in FIG. 1, it is understood that this is merely one possible application. In general, each of the different patterns of conductive paths as exemplified in FIGS. 3-8 is intended to alter the radar cross-sectional area of the structure to which it is applied. In other words, the specular patterns of conductive paths may be applied to a structure and used as a stealth agent to cloak the structure from enemy radar, i.e. render it substantially transparent to radar. For example, a chosen pattern of conductive paths may be integrated into composite material forming a skin of the structure, like an airfoil of an aircraft, for example. With the addition of the pattern of conductive paths, the structure becomes a radar altering structure (RAS) so that the radar cross-sectional area of the structure is substantially reduced.

It is further understood that the same pattern of conductive paths need not be applied to the overall structure. For example, it may be desired that one pattern be applied to the top of an airfoil and a different pattern be applied to the bottom thereof. Or, one pattern may be applied to the front surface of the airfoil while a different pattern may be applied to the rear surface thereof. Different specular patterns may be even applied in a plurality of layers to the structure. Accordingly, to render the structure a radar altering structure may involve applying one or more patterns of conductive paths to respective portions of the structure and electrifying the conductive paths thereof.

Figure 9:
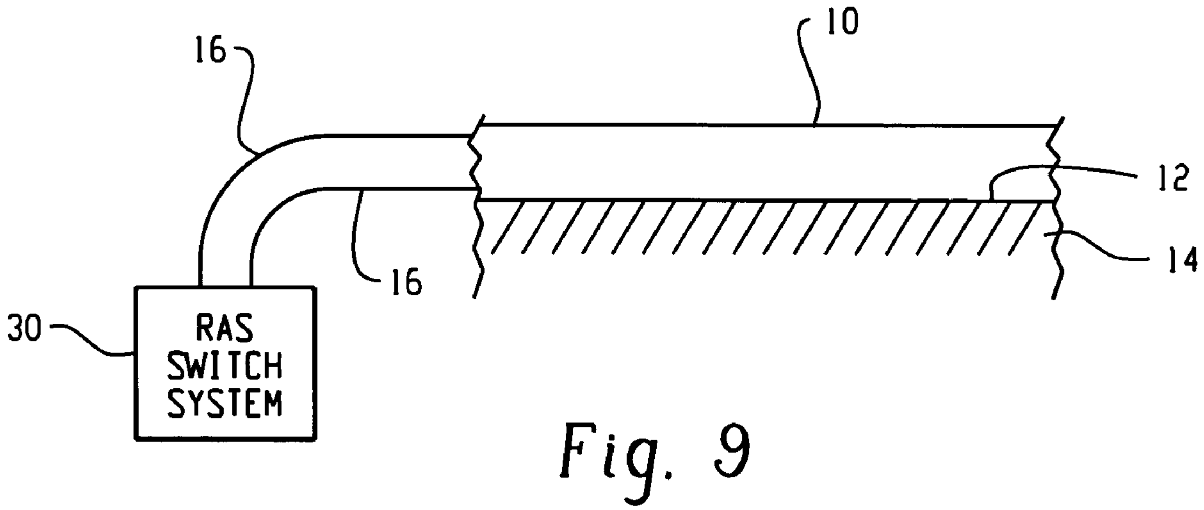
FIG. 9 is a cross-sectional schematic illustration of a radar altering structure switching apparatus suitable for embodying another aspect of the present invention.

In addition, once applied to the structure, the pattern of conductive paths may be controlled to create special radar signatures of the structure to illuminating radars. For example, the conductive paths 16 of the pattern 10 may be coupled to a RAS switch system 30 as shown in the schematic illustration of FIG. 9 and operated as a special antenna to illuminating radars. Referring to FIG. 9, the system 30 may be operative to connect and disconnect the conductive paths to a voltage source or ground, for example. Thus, when connected, the conductive paths 16 become closed circuits and render the structure transparent to the illuminating radar, and when disconnected, the paths 16 are open-circuits and floating, i.e. ungrounded, and render the structure apparent to the radar. Therefore, the pattern of conductive paths may be controlled by closing and opening the circuits thereof to respond differently to illuminating radar signals, and possibly, send out false radar return signals to mislead the enemy.

While the present invention has been described herein above in connection with one or more embodiments, it is understood that such presentation is merely by way of example with no intent of limiting the present invention in any way by any single embodiment. Rather, the present invention should be construed in breadth and broad scope in accordance with the recitation of the claims appended hereto.

What is claimed is:

1. A radar altering structure comprising:

a structure; and at least one planar layer of conductive material disposed on at least one surface of said structure, said layer comprising a plurality of conductive paths arranged in a specular pattern to reduce a radar cross section of said structure, each conductive path comprising zig-zag and angular line runs positioned to provide opposing perpendicular lines of reflectance illuminating electromagnetic radiation at a desired angle away from a source thereof, the layer includes an end having the zig-zag conductive path formed into an angle of about 45° with respect to a line of sight of a point source monostatic radar, a destructive zone of interference for an electromagnetic wave being created by a point of the angle being directed toward a source of the electromagnetic wave.

2. The radar altering structure of claim 1 wherein the conductive paths of the layer are juxtaposed and electrically isolated from one another with one conductive path being circumscribed by another extending outwardly until an outer conductive path of the plurality completes the overall specular pattern.

3. The radar altering structure of claim 1 wherein the conductive paths are configured to create destructive zones of interference to the illuminating electromagnetic radiation from the source.

4. The radar altering structure of claim 1 wherein the conductive paths of the layer are juxtaposed and electrically isolated from one another, each path starting at one side of the layer, running back and forth across the layer forming a plurality of multi-sided sub-patterns one within the other, and ending at another side of the layer to form the overall pattern.

5. The radar altering structure of claim 4 wherein the conductive paths of the layer are wavy line paths configured to reflect illuminating electromagnetic radiation away from a source thereof.

6. The radar altering structure of claim 1 including a power source coupled to the plurality of conductive paths, said power source for electrifying the conductive paths.

7. The radar altering structure of claim 1 including a power source coupled to the plurality of conductive paths, said power source for selectively electrifying the conductive paths.

8. The radar altering structure of claim 1 wherein the structure comprises a composite non-metallic material; and wherein the at least one layer of conductive material is embedded in said composite non-metallic material.

9. The radar altering structure of claim 1 wherein the pattern of the conductive paths is formed by one of the group of metal wires, etched foil and metallic coated fabric.

10. Electrothermal deicing apparatus with radar altering properties, said apparatus comprising:

a heating element comprising at least one planar layer of conductive material disposable on at least one surface of a structure for deicing said surface, said layer comprising a plurality of conductive paths arranged in a specular pattern to reduce a radar cross section of said structure, each conductive path comprising zig-zag and angular line runs positioned to provide opposing perpendicular lines of reflectance illuminating electromagnetic radiation at a desired angle away from a source thereof the layer including an end having the zig-zag conductive path formed into respective angles of about 45° with respect to a line of sight of a point source monostatic radar, a destructive zone of interference for an electromagnetic wave being created by a point of the angle being directed toward a source of the electromagnetic wave; and control unit coupled to said heating element for controlling the heating energy thereto to deice said surface.

11. The apparatus of claim 10 wherein the conductive paths of the heating element are juxtaposed and electrically isolated from one another with one conductive path being circumscribed by another extending outwardly until an outer conductive path of the plurality completes the overall specular pattern.

12. The apparatus of claim 11 wherein the zig-zag and angular line runs form repeating subpatterns of the respective angles to at least one of reflect the electromagnetic waves away from returning to their source and to create the destructive interference between the electromagnetic waves.

13. The apparatus of claim 10 wherein the conductive paths are configured to create destructive zones of interference to the illuminating electromagnetic radiation from the source.

14. The apparatus of claim 10 wherein the conductive paths of the heating element are juxtaposed and electrically isolated from one another, each path starting at one side of the element, running back and forth across the element forming a plurality of multi-sided sub-patterns one within the other, and ending at another side of the element to form the overall pattern.

15. The apparatus of claim 14 wherein the conductive paths of the layer are wavy line paths configured to reflect illuminating electromagnetic radiation away from a source thereof.

16. The apparatus of claim 10 wherein the at least one layer of conductive material of the heating element is embeddable in a composite non-metallic surface material.

17. The apparatus of claim 10 wherein the pattern of the conductive paths is formed by one of the group of metal wires, etched foil and metallic coated fabric.

18. Apparatus for creating different radar signatures of a structure to an illuminating electromagnetic radiation source, said apparatus comprising:

at least one planar layer of conductive material disposable on at least one surface of a structure, said layer comprising a plurality of conductive paths arranged in a specular pattern to reduce a radar cross section of said structure, each conductive path comprising short, zig-zag and angular straight line runs positioned to provide opposing perpendicular lines of reflectance illuminating electromagnetic radiation at a desired angle away from a source thereof, the layer including an end having the zig-zag conductive oath formed into respective angles of about 45° with respect to a line of sight of a point source monostatic radar, a destructive zone of interference for an electromagnetic wave being created by a point of the angle being directed toward a source of the electromagnetic wave; and a switching unit coupled to said layer of conductive material to selectively apply electrical energy thereto for creating different radar signatures of the structure to the illuminating electromagnetic radiation source.

19. The apparatus of claim 18 wherein the layer of conductive material is controlled to respond in one way to the illuminating electromagnetic radiation when electrical energy is applied, and in another way when the application of electrical energy is interrupted.

20. The apparatus of claim 18 wherein the zig-zag and angular line runs form reneating subpatterns of the respective angles to at least one of reflect the electromagnetic waves away from returning to their source and to create the destructive interference between the electromagnetic waves.

21. The apparatus of claim 18 wherein each of the conductive paths forms repeating sub-patterns.

* * * * *

UNITED STATES PATENT AND TRADEMARK OFFICE

CERTIFICATE OF CORRECTION

PATENT NO. : 7,633,450 B2
APPLICATION NO. : 11/586892
DATED : December 15, 2009
INVENTOR(S) : David L. Brittingham and James T. Hindel It is certified that error appears in the above-identified patent and that said Letters Patent is hereby corrected as shown below:

Col. 5 Claim 12, line 41, "claim 11" should read --claim 10--.

Col. 6 Claim 20, line 43, "reneating" should read --repeating--.

Signed and Sealed this
Fourth Day of January, 2011

David J. Kappos
*Director of the United States Patent and Trademark Office*